US012584741B2

(12) United States Patent
Watanabe et al.

(10) Patent No.: US 12,584,741 B2
(45) Date of Patent: Mar. 24, 2026

(54) INERTIAL MEASUREMENT DEVICE AND METHOD FOR MANUFACTURING INERTIAL MEASUREMENT DEVICE

(71) Applicant: SEIKO EPSON CORPORATION, Tokyo (JP)

(72) Inventors: Toru Watanabe, Matsumoto (JP); Hiroyuki Ogiso, Ina (JP)

(73) Assignee: SEIKO EPSON CORPORATION (JP)

( * ) Notice: Subject to any disclaimer, the term of this patent is extended or adjusted under 35 U.S.C. 154(b) by 276 days.

(21) Appl. No.: 18/360,316

(22) Filed: Jul. 27, 2023

(65) Prior Publication Data

US 2024/0035823 A1 Feb. 1, 2024

(30) Foreign Application Priority Data

Jul. 28, 2022 (JP) .................................. 2022-120267

(51) Int. Cl.
G01C 19/5712 (2012.01)
G01C 25/00 (2006.01)
G01P 1/00 (2006.01)
G01P 15/125 (2006.01)
G01P 15/18 (2013.01)

(52) U.S. Cl.
CPC ......... G01C 19/5712 (2013.01); G01C 25/00 (2013.01); G01P 1/00 (2013.01); G01P 15/125 (2013.01); G01P 15/18 (2013.01)

(58) Field of Classification Search
CPC ........................... G01C 19/5712; G01C 25/00; G01C 19/5783; G01C 21/16; G01P 1/00; G01P 15/125; G01P 15/18; G01P 1/023
See application file for complete search history.

(56) References Cited

U.S. PATENT DOCUMENTS

2016/0003650 A1* 1/2016 Kanamaru ........... G01D 11/245
73/431
2017/0059605 A1* 3/2017 Saito .................. G01C 19/5783

FOREIGN PATENT DOCUMENTS

JP 2017-049122 A 3/2017

* cited by examiner

*Primary Examiner* — Tarun Sinha
(74) *Attorney, Agent, or Firm* — Harness, Dickey & Pierce, P.L.C.

(57) ABSTRACT

An inertial measurement device includes: a substrate having a joining area; a cap; a sensor device accommodated in a resin package and disposed in a mounting area on the substrate in an internal space between the substrate and the cap; and a sealing material and a joining material configured to join the cap to the substrate in the joining area of the substrate. The joining material surrounds the mounting area and has a communication hole for communication between the internal space and the outside, and the sealing material closes the communication hole.

8 Claims, 18 Drawing Sheets

*FIG. 2*

INERTIAL MEASUREMENT DEVICE AND METHOD FOR MANUFACTURING INERTIAL MEASUREMENT DEVICE

The present application is based on, and claims priority from JP Application Serial Number 2022-120267, filed on Jul. 28, 2022, the disclosure of which is hereby incorporated by reference herein in its entirety.

BACKGROUND

1. Technical Field

The present disclosure relates to an inertial measurement device and a method for manufacturing the same.

2. Related Art

There is known an inertial measurement device that includes an inertial sensor module including an inertial sensor such as an acceleration sensor or an angular velocity sensor. The inertial measurement device is assembled in various electronic devices and machines, or is mounted on a moving body such as an automobile, and is used to monitor an inertial quantity such as an acceleration and an angular velocity.

For example, JP-A-2017-49122 discloses a sensor unit that includes a sensor device including an inertial sensor resin-sealed with a sealing resin.

When moisture enters the sealing resin from the outside, a stress of the sealing resin may vary. When the stress of the sealing resin varies, the inertial sensor may be deformed, which may affect measurement of the sensor device. In other words, there is a demand for an inertial measurement device that reduces an influence of moisture and that has high detection accuracy, and a method for manufacturing the same.

SUMMARY

An inertial measurement device according to an aspect of the present application includes: a substrate having a joining area; a cap; a sensor device accommodated in a resin package and disposed in a mounting area on the substrate in an internal space between the substrate and the cap; and a sealing material and a joining material configured to join the cap to the substrate in the joining area of the substrate. The joining material surrounds the mounting area and has a communication hole for communication between the internal space and the outside, and the sealing material closes the communication hole.

A method for manufacturing the inertial measurement device according to the aspect of the present application includes: applying solder cream to a mounting area of a substrate, and a joining land having a recess serving as a communication hole in a joining area surrounding the mounting area; placing a sensor device on the mounting area; placing a cap on the joining area; performing reflow on the substrate; and sealing the communication hole by soldering.

BRIEF DESCRIPTION OF THE DRAWINGS

FIG. 2 is a cross-sectional view taken along a line b-b in FIG. 1.

DESCRIPTION OF EMBODIMENTS

First Embodiment

Schematic Configuration of Inertial Measurement Device

Figure 1:
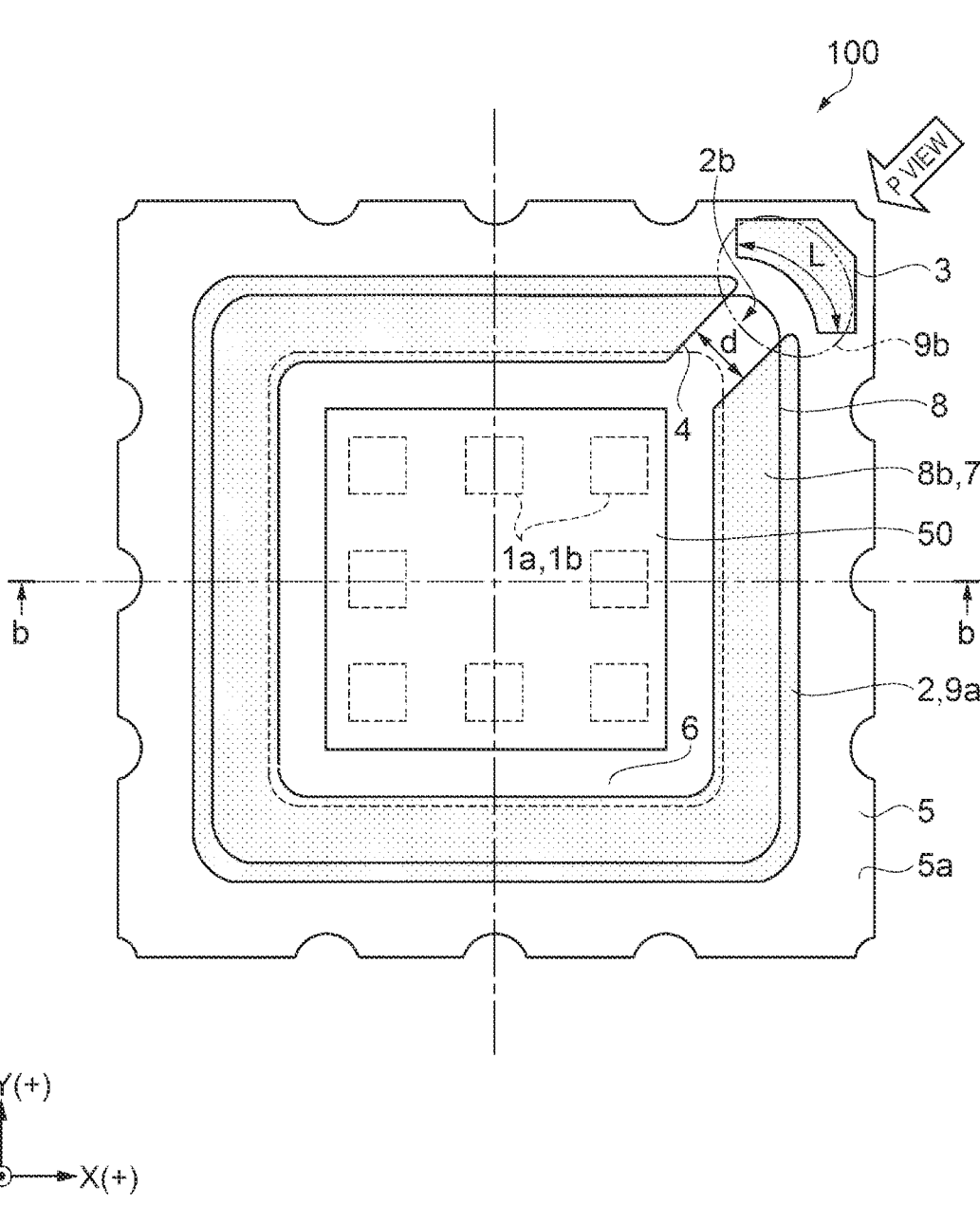
FIG. 1 is a plan view of an inertial measurement device according to a first embodiment.
Figure 2:
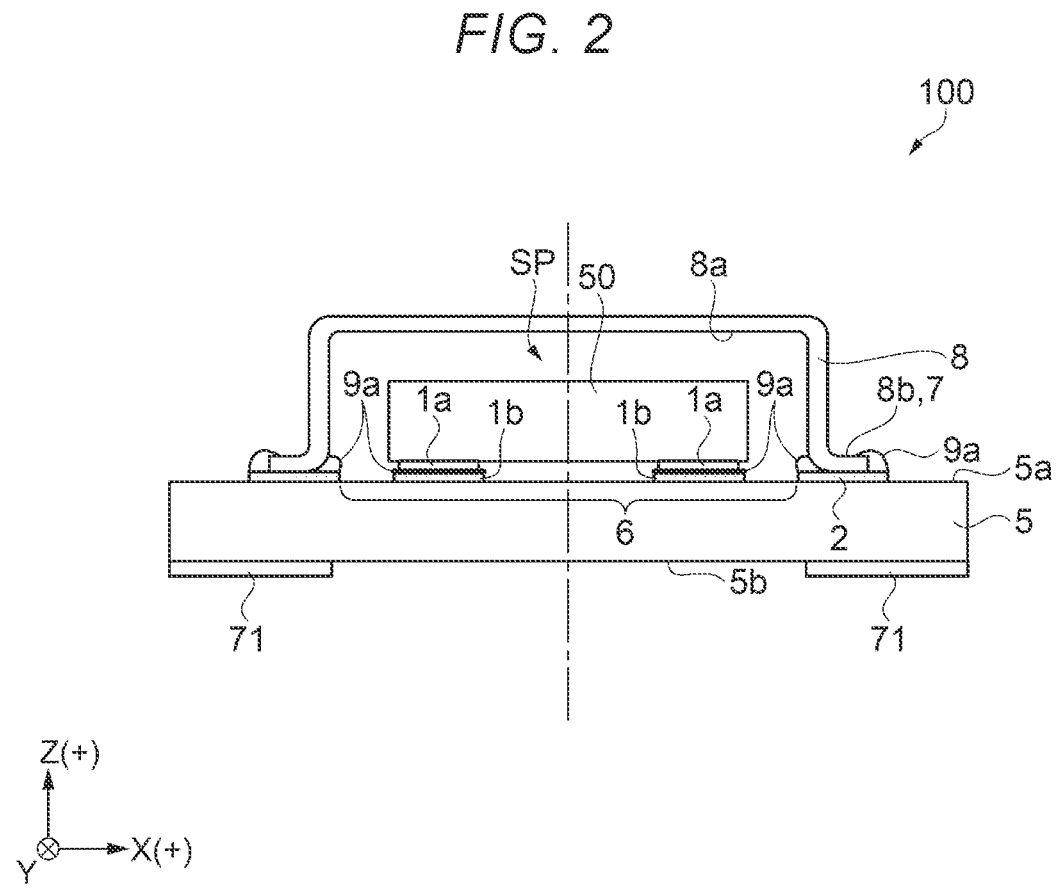

FIG. 1 is a plan view showing a schematic configuration of an inertial measurement device. FIG. 2 is a cross-sectional view taken along a line b-b in FIG. 1.

First, a schematic configuration of an inertial measurement device 100 according to an embodiment will be described with reference to FIGS. 1 and 2. In the drawings, an X axis, a Y axis, and a Z axis are shown as three axes orthogonal to one another. In the embodiment, a first axis is the X axis, a second axis is the Y axis, and a third axis is the Z axis. A direction along the X axis is referred to as an "X direction", a direction along the Y axis is referred to as a "Y direction", and a direction along the Z axis is referred to as a "Z direction". A tip end side of an arrow in each axial direction is also referred to as a "plus side", a base end side thereof is also referred to as a "minus side", a plus side in the Z direction is also referred to as "upper", and a minus side in the Z direction is also referred to as "lower". The Z direction is along a vertical direction, and an XY plane is along a horizontal plane. A plus direction and a minus direction are also collectively referred to as the X direction, the Y direction, and the Z direction.

The inertial measurement device 100 according to the embodiment includes a sensor device 50, a substrate 5, and a cap 8.

The sensor device 50 is, for example, a six-axis combo sensor including a three-axis gyro sensor and a three-axis acceleration sensor. A sensor element manufactured by processing a silicon substrate using a micro electro mechanical systems (MEMS) technique is used as a sensor element for each axis. The sensor device 50 has a flat rectangular parallelepiped shape, and a plurality of electrode terminals 1a are provided at a lower surface thereof. Details will be described later, and an exterior of the sensor device 50 is resin-molded.

The substrate 5 is a substrate having a substantially rectangular shape in a plan view. In a preferred example, a ceramic substrate formed by stacking a plurality of ceramic substrates is used. An upper surface of the substrate 5 is a mounting surface. A plurality of mounting terminals 71 are disposed at a lower surface 5b (FIG. 2), which is an opposite-side surface from the upper surface 5a. The plurality of mounting terminals 71 are electrically coupled to the corresponding electrode terminals 1a of the sensor device 50 via wirings and via holes that are not shown. The inertial measurement device 100 is mounted on a substrate of a host device such as an inertial measurement unit, which will be described later, by the plurality of mounting terminals 71. The substrate 5 is not limited to the ceramic substrate, and may be a rigid substrate having airtightness. For example, a glass epoxy substrate, a glass composite substrate, or the like may be used.

As shown in FIG. 2, the sensor device 50 and the cap 8 are mounted on the upper surface 5a of the substrate Specifically, the sensor device 50 is disposed in a mounting area 6 substantially in a center of the upper surface 5a, and the cap 8 is disposed in a joining area 7 surrounding the mounting area 6.

The electrode terminal 1a of the sensor device 50 is joined to a first land 1b, which is a mounting pattern provided in the mounting area 6, by a joining material 9a. The joining material 9a is solder. In other words, the first lands 1b for mounting the sensor device 50 are provided in the mounting area 6.

The cap 8 is a metal cover member having a cavity 8a. The cap 8 has a bathtub shape, and has a configuration in which a periphery of a recess formed by the cavity 8a is surrounded by a flange portion 8b. In a preferred example, the cap 8 is formed of a member obtained by pressing a brass plate member, and has a tin-plated surface. A material of the cap 8 is not limited to brass, and other metals such as Kovar may be used. In other words, the cap 8 is preferably a metal cap. The cap 8 may be made of a ceramic material, and in this case, a metal pattern is provided on an entire surface of the flange portion 8b to enable soldering.

The flange portion 8b is joined to a second land 2, which is a mounting pattern provided in the joining area 7 of the substrate 5, by the joining material 9a. The joining material 9a is solder. The sensor device 50 is accommodated in an internal space SP formed by the cavity 8a of the cap 8. The internal space SP corresponds to an accommodating portion for the sensor device 50.

As shown in FIG. 1, the joining area 7 is a portion of the upper surface 5a of the substrate 5 on which the flange portion 8b of the cap 8 is placed, and is a substantially rectangular annular area surrounding the mounting area 6.

The second land 2 is provided on the joining area 7, and has one apex portion cut out. In other words, the second land 2 is divided at the apex portion. The cut-out portion is a recess 2b lower than around the second land 2. When the cap 8 is set on the second land 2 and joined by the joining material 9a (FIG. 2), a communication hole 4 is formed between the flange portion 8b and the recess 2b. A height of the recess 2b is a thickness of the second land 2 and is, for example, approximately 30 μm to 50 μm, but is not limited to this, and may be any height for functioning as an air hole. In other words, the recess 2b serving as the communication hole 4 is formed in the cutout portion of the second land 2. It is preferable that the joining area 7 includes a bent portion having an apex, and the communication hole 4 is formed in the bent portion.

The communication hole 4 functions as an air hole for communication between the internal space SP of the cap 8 and the outside.

A third land 3 is provided outside the communication hole 4. The third land 3 is formed in an L shape at one apex portion of the substrate 5 and faces the communication hole 4. A side of the third land 3 facing the communication hole 4 is curved along an opening of the communication hole 4.

Here, when a width of the recess 2b, which is the cutout portion of the second land 2 corresponding to the communication hole 4, is a width d, and a length of a portion of the third land 3 facing the communication hole 4 is a length L, the length L is set to be 1.5 times to 5 times the width d. This is to set the dimensions suitable for closing the communication hole 4 by disposing a sealing material 9b from the second land 2 to the third land 3.

Sealing State of Communication Hole

Figure 3:
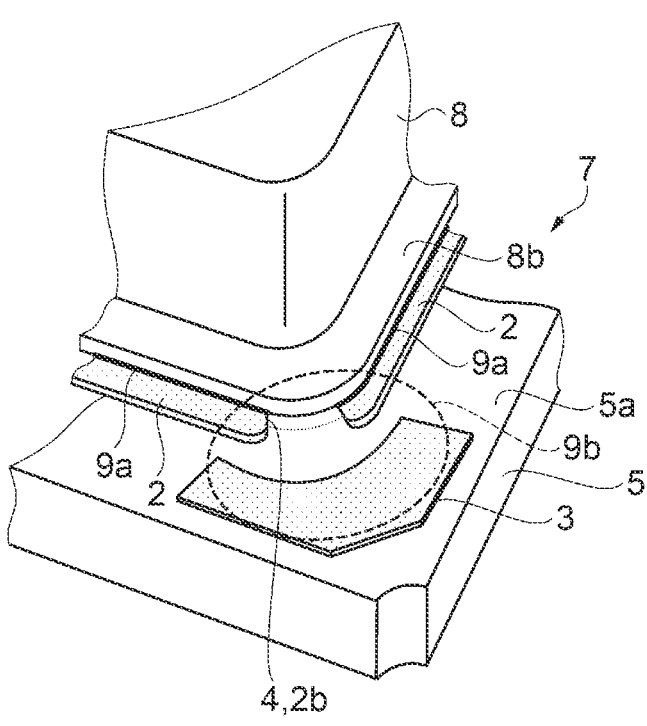
FIG. 3 is a perspective view from a P view in FIG. 1.

FIG. 3 is an enlarged perspective view from a P view in FIG. 1.

FIG. 3 is an enlarged perspective view of a peripheral portion around the communication hole 4.

As shown in FIG. 3, the communication hole 4 is formed between the recess 2b, which is the cutout portion of the second land 2, and the flange portion 8b of the cap 8. The second land 2 and the flange portion 8b are joined by the joining material 9a. The joining material 9a is solder.

As shown in FIG. 3, the communication hole 4 is hermetically sealed by the sealing material 9b. Specifically, the sealing material 9b is provided by soldering from the second land 2 to the third land 3. Actually, since the solder wets and spreads, the sealing material 9b also extends to the flange portion 8b of the cap 8. In FIG. 3, the joining material 9a is indicated by a solid line and the sealing material 9b is indicated by a dotted line in order to clarify each constituent portion. Actually, the joining material 9a and the sealing material 9b are integrated to cover the flange portion 8b, the second land 2 and the third land 3, and seal the communication hole 4. In other words, the joining material 9a that joins the cap 8 to the substrate 5, and the sealing material 9b are provided in the joining area 7. The sealing material 9b closes the communication hole 4.

The internal space SP of the cap 8 (FIG. 2) is hermetically sealed by the sealing material 9b while being filled with an inert gas. In a preferred example, the internal space SP is hermetically sealed while being filled with nitrogen gas.

Method for Manufacturing Inertial Measurement Device

Figure 4:
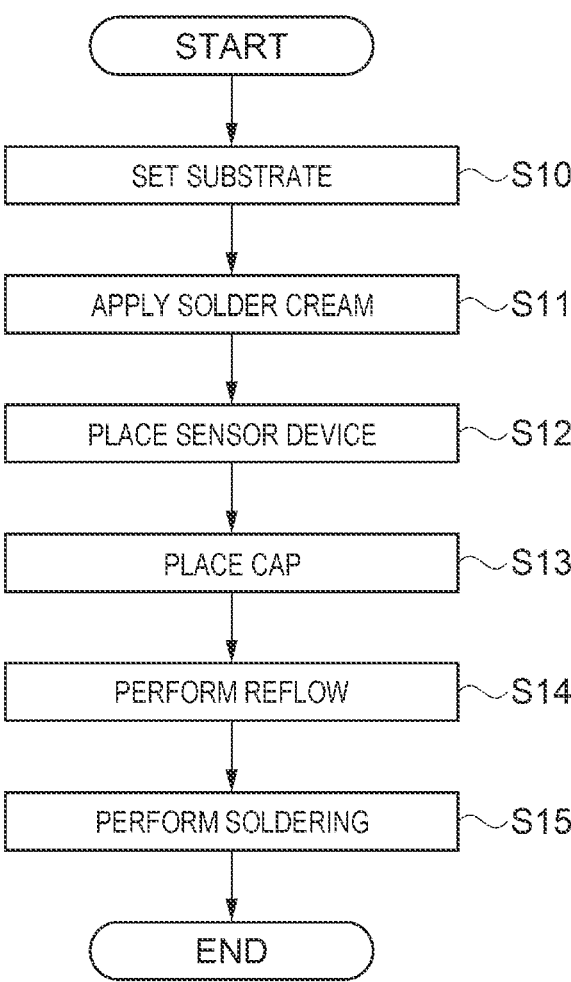
FIG. 4 is a flowchart showing a flow of a method for manufacturing the inertial measurement device.
Figure 5:
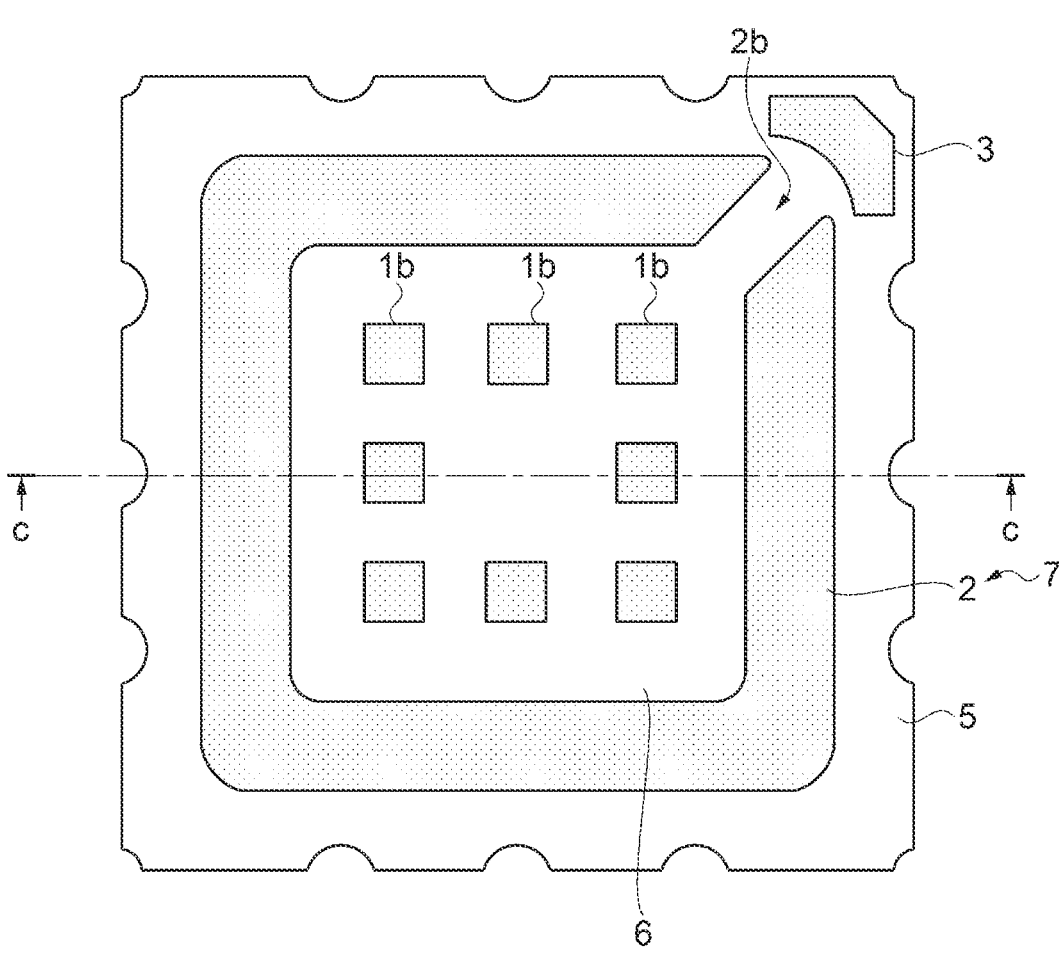
FIG. 5 is a plan view showing a state of a substrate in a manufacturing process.
Figure 5:
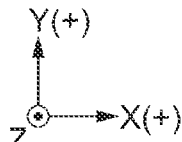
Figure 6:
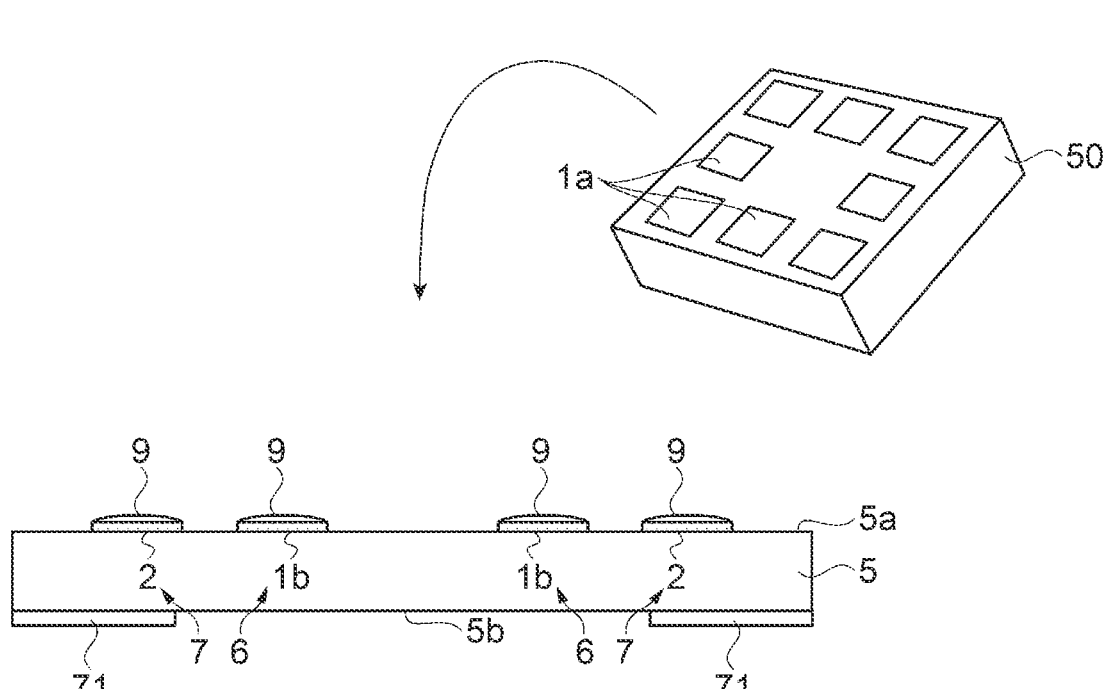
FIG. 6 is a cross-sectional view showing a state of the substrate in the manufacturing process.

FIG. 4 is a flowchart showing a flow of a method for manufacturing the inertial measurement device. FIG. 5 is a plan view showing a state of the substrate in a manufacturing process. FIG. 6 is a cross-sectional view of the substrate taken along a line c-c in FIG. 5 and corresponds to FIG. 2.

Here, a method for manufacturing the inertial measurement device 100 will be described.

In step S10, the substrate 5 is set. As shown in FIG. 5, the first lands 1b, the second land 2, and the third land 3 are disposed on the substrate 5 in an initial state. A wiring pattern in which gold is plated on a copper and nickel base is used for each land in a preferred example, but the present disclosure is not limited thereto, and any wiring pattern capable of being soldered may be used. In other words, the first lands 1*b* for mounting the sensor device 50 are provided in the mounting area 6, and the second land 2 corresponding to the joining material 9*a* (FIG. 3) is provided in the joining area 7. In a preferred example, a plurality of substrates 5 are set on a dedicated jig in a state of forming a large-sized substrate.

In step S11, solder cream 9 is applied to the first lands 1*b* in the mounting area 6 and the second land 2 in the joining area 7 of the substrate 5. Specifically, as shown in FIG. 6, the solder cream 9 is applied onto the first lands 1*b* and the second land 2 serving as a joining land. In a preferred example, the solder cream 9 is applied by screen printing using a mask having openings in portions that come into contact with the first lands 1*b* and the second land 2. At this time, the solder cream is not applied to the third land 3. The application may be performed using a dispenser. In other words, in a step of applying the solder cream 9, the solder cream 9 is applied to the mounting area 6 of the substrate 5, and the second land 2 as the joining land having the recess 2*b* serving as the communication hole 4 in the joining area 7 surrounding the mounting area 6.

In step S12, the sensor device 50 is placed on the substrate 5. Specifically, as shown in FIG. 6, the sensor device 50 is placed substantially in the center of the upper surface 5*a* of the substrate 5 with a surface on an electrode terminal 1*a* side of the sensor device 50 facing downward. The sensor device 50 is face-down mounted on the substrate 5. In other words, the sensor device 50 is placed on the mounting area 6 in this step.

In step S13, the cap 8 is placed on the substrate Specifically, as shown in FIG. 2, the cap 8 is placed with the flange portion 8*b* aligned with the second land 2. In other words, the cap 8 is placed on the joining area 7 in this step.

In step S14, the substrate 5 on which the sensor device 50 and the cap 8 are placed is subjected to a reflow process. In a preferred example, a plurality of substrates pass through a reflow furnace set at a predetermined temperature in a state of forming a large-sized substrate. In a state after the reflow, the joining material 9*a* surrounds the mounting area 6 and has the communication hole 4 for communication between the internal space SP and the outside as shown in FIG. 1.

Here, when the communication hole 4 is not formed, there is no space for release when air in the internal space SP of the cap 8 expands due to a high temperature, and thus lifting-up of the cap 8 occurs, making hermetic sealing difficult. On the other hand, according to the inertial measurement device 100, since expanded air can be released from the communication hole 4, lifting-up of the cap 8 does not occur.

In step S15, the communication hole 4 is sealed by the sealing material 9*b*. Specifically, as shown in FIG. 3, the communication hole 4 is sealed by the sealing material 9 by soldering from the second land 2 to the third land 3 so as to cover the communication hole 4. In a preferred example, in a chamber filled with nitrogen gas, the substrates 5 are soldered one by one in a state of forming a large-sized substrate. In other words, the communication hole 4 is sealed by soldering in this step. After a sealing step is completed, the large-sized substrate is taken out from the chamber and divided into small pieces one by one to complete the inertial measurement device 100.

Outline of Sensor Device

Figure 7:
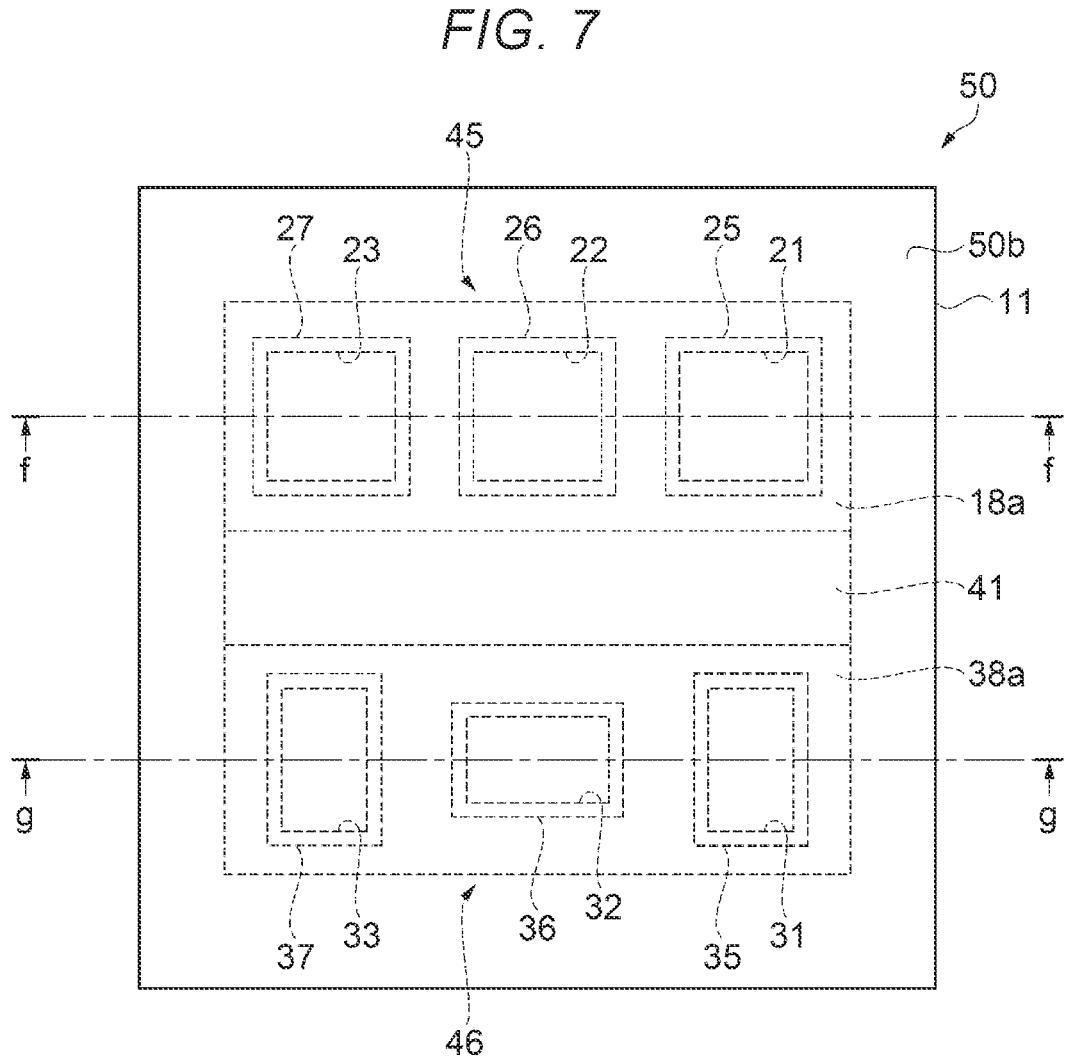
FIG. 7 is a transparent plan view showing an outline of a sensor device.
Figure 7:
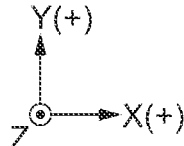
Figure 8:
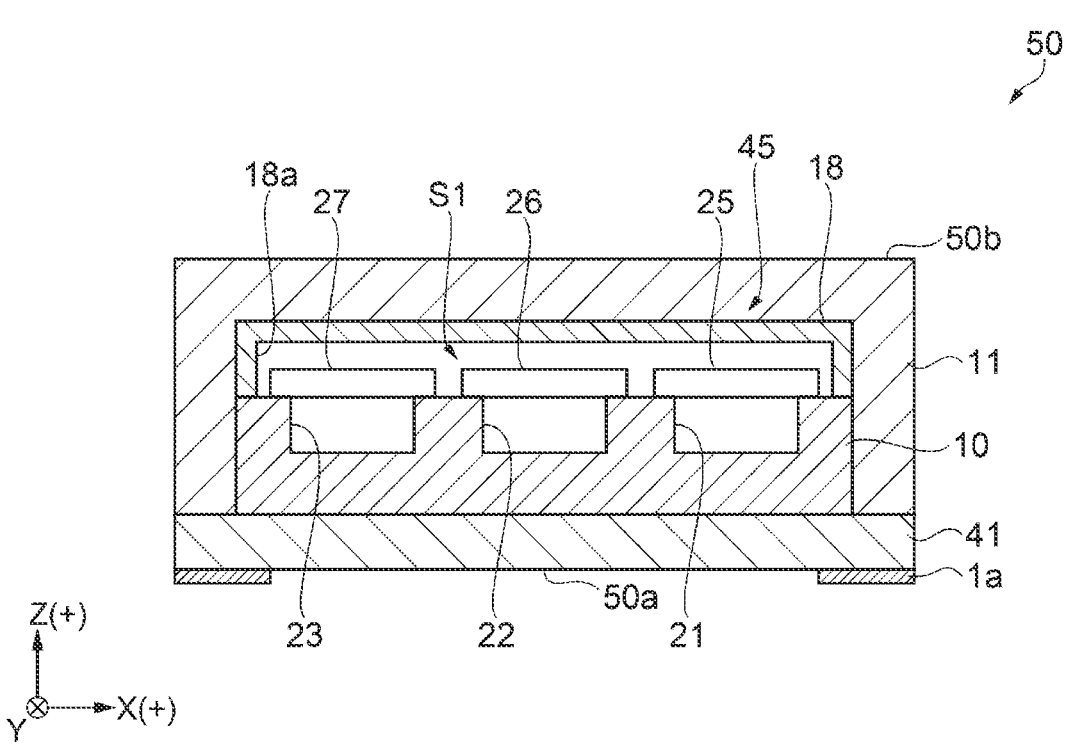
FIG. 8 is a cross-sectional view taken along a line f-f in FIG. 7.
Figure 9:
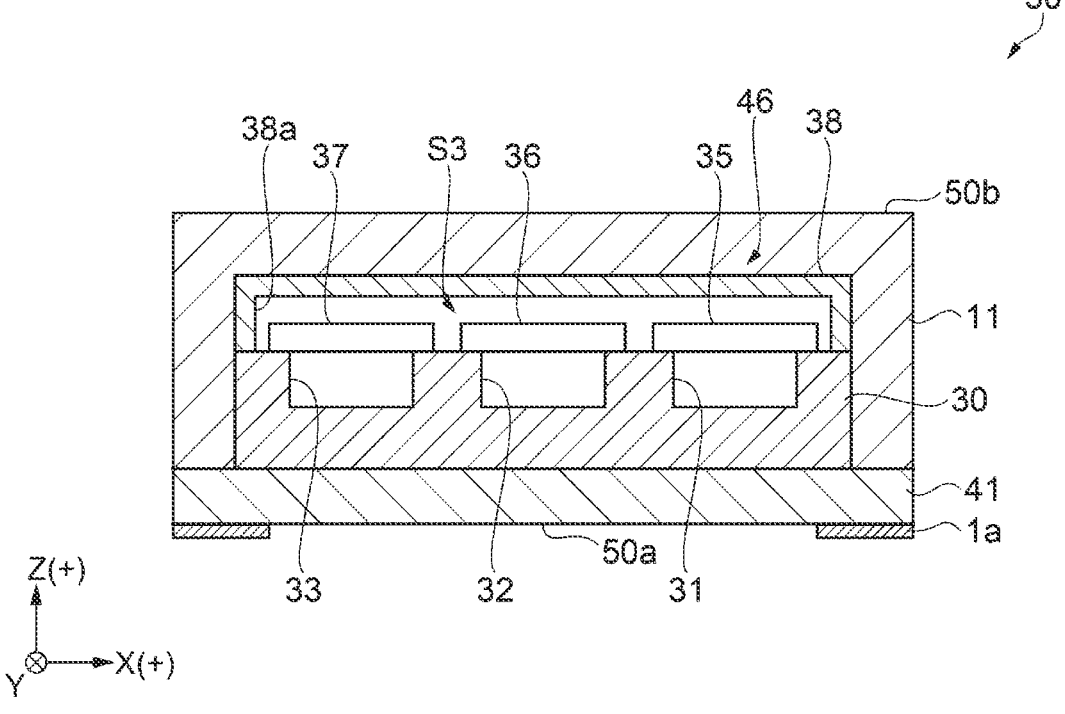
FIG. 9 is a cross-sectional view taken along a line g-g in FIG. 7.

FIG. 7 is a transparent plan view showing an outline of the sensor device. FIG. 8 is a cross-sectional view taken along a line f-f in FIG. 7. FIG. 9 is a cross-sectional view taken along a line g-g in FIG. 7.

FIG. 7 is the transparent plan view of the sensor device 50 observed from a Z plus side. As shown in FIG. 7, the sensor device 50 includes a first inertial sensor 45, a second inertial sensor 46, and the like disposed on a pedestal plate 41. The pedestal plate 41 is a substrate on which two sensors are placed.

As shown in FIG. 8, the first inertial sensor 45 includes a base 10, a cover 18, a first gyro sensor element 25, a second gyro sensor element 26, and a third gyro sensor element 27. The first gyro sensor element 25, the second gyro sensor element 26, and the third gyro sensor element 27 are accommodated in an accommodating space S1 formed by the base 10 and the cover 18. The accommodating space S1 is an airtight space and is in a depressurized state, preferably in a state close to vacuum.

In the first inertial sensor 45, the first gyro sensor element 25 detects an angular velocity around the X axis, the second gyro sensor element 26 detects an angular velocity around the Y axis, and the third gyro sensor element 27 detects an angular velocity around the Z axis. Each of the first gyro sensor element 25, the second gyro sensor element 26, and the third gyro sensor element 27 is a gyro sensor element manufactured by processing a silicon substrate using the MEMS technique, and detects the angular velocity based on a change in capacitance between a movable electrode and a fixed electrode.

Three recesses 21, 22, and 23 are formed in the base 10, and the first gyro sensor element 25, the second gyro sensor element 26, and the third gyro sensor element 27 are disposed on the base 10 in a manner of corresponding to the recess 21, the recess 22, and the recess 23, respectively. The recesses 21, 22, and 23 function as clearance portions for preventing the first gyro sensor element 25, the second gyro sensor element 26, and the third gyro sensor element 27 from coming into contact with the base 10.

The base 10 is a silicon substrate. The base 10 may be a substrate formed mainly of a glass material containing alkali metal ions, such as Pyrex (registered trademark) glass. A sensor structure is formed of a material such as polysilicon on the base 10 by a step conforming to a silicon semiconductor process. The sensor structure according to the embodiment includes the first gyro sensor element 25, the second gyro sensor element 26, and the third gyro sensor element 27.

A recess 18*a* is formed in the cover 18, and the cover 18 is joined to the base 10, whereby the accommodating space S1 is formed to accommodate the first gyro sensor element 25, the second gyro sensor element 26, and the third gyro sensor element 27. The recess 18*a* faces the three recesses 21, 22, and 23 of the base 10. In the embodiment, the cover 18 is formed of a silicon substrate. A glass frit or the like is used to join the base 10 and the cover 18, and the sensor structure is finally hermetically sealed against outside air. A configuration of the sensor device described above is an example, and other examples may be used. For example, gyro sensors may have a common drive unit and separate detection units for each axis. Further, an integrated circuit that implements control and detection of the first gyro sensor element 25, the second gyro sensor element 26, and the third gyro sensor element 27 may be coupled to the first gyro sensor element 25, the second gyro sensor element 26, and the third gyro sensor element 27, or may be stacked on the first gyro sensor element 25, the second gyro sensor element 26, and the third gyro sensor element 27.

Return to FIG. 7.

The second inertial sensor 46 includes a first acceleration sensor element 35, a second acceleration sensor element 36, and a third acceleration sensor element 37, and is a three-axis acceleration sensor capable of measuring accelerations of detection axes in the X direction as the first axis, the Y direction as the second axis, and the Z direction as the third axis. Each of the first acceleration sensor element 35, the second acceleration sensor element 36, and the third acceleration sensor element 37 is an acceleration sensor element manufactured using the MEMS technique, and detects the acceleration based on a change in capacitance between a movable electrode and a fixed electrode. In other words, the sensor device 50 includes the second inertial sensor 46 that detects a physical quantity different from a physical quantity detected by the first inertial sensor 45.

As shown in FIG. 9, the second inertial sensor 46 includes a base 30, a cover 38, the first acceleration sensor element 35, the second acceleration sensor element 36, and the third acceleration sensor element 37. The first acceleration sensor element 35, the second acceleration sensor element 36, and the third acceleration sensor element 37 are accommodated in an accommodating space S3 formed by the base 30 and the cover 38. The accommodating space S3 is an airtight space in which an inert gas such as nitrogen, helium, or argon is sealed, and is preferably used at a temperature of approximately −40° C. to 125° C. and substantially at an atmospheric pressure. However, an atmosphere of the accommodating space S3 is not particularly limited, and may be in a depressurized state or a pressurized state, for example. The base 10 and the base 30 are separate, and may be integrated. That is, the first gyro sensor element 25, the second gyro sensor element 26, the third gyro sensor element 27, the first acceleration sensor element 35, the second acceleration sensor element 36, and the third acceleration sensor element 37 may be formed on one base, for example, the base 10.

In the second inertial sensor 46, the first acceleration sensor element 35 detects an acceleration in the X direction, the second acceleration sensor element 36 detects an acceleration in the Y direction, and the third acceleration sensor element 37 detects an acceleration in the Z direction.

Three recesses 31, 32, and 33 are formed in the base 30, and the first acceleration sensor element 35, the second acceleration sensor element 36, and the third acceleration sensor element 37 are disposed on the base 30 in a manner of corresponding to the recess 31, the recess 32, and the recess 33, respectively. The recesses 31, 32, and 33 function as clearance portions for preventing the first acceleration sensor element 35, the second acceleration sensor element 36, and the third acceleration sensor element 37 from coming into contact with the base 30.

The base 30 is a silicon substrate. The base may be a substrate formed mainly of a glass material containing alkali metal ions, such as Pyrex (registered trademark) glass. A sensor structure is formed of a material such as polysilicon on the base 30 by a step conforming to the silicon semiconductor process. The sensor structure according to the embodiment includes the first acceleration sensor element 35, the second acceleration sensor element 36, and the third acceleration sensor element 37.

A recess 38a is formed in the cover 38, and the cover 38 is joined to the base 30, whereby the accommodating space S3 is formed to accommodate the first acceleration sensor element 35, the second acceleration sensor element 36, and the third acceleration sensor element 37. The recess 38a faces the three recesses 31, 32, and 33 of the base 30. In the embodiment, the cover 38 is formed of a silicon substrate. Accordingly, the cover 38 and the base can be firmly joined by anodic joining. A glass frit or the like is used to join the base 30 and the cover 38, and the sensor structure is finally hermetically sealed against the outside air. The configuration of the sensor device described above is an example, and other examples may be used. Further, an integrated circuit that implements control and detection of the first acceleration sensor element 35, the second acceleration sensor element 36, and the third acceleration sensor element 37 may be coupled to the first acceleration sensor element 35, the second acceleration sensor element 36, and the third acceleration sensor element 37, or may be stacked on the first acceleration sensor element 35, the second acceleration sensor element 36, and the third acceleration sensor element 37.

Return to FIG. 7.

Such a sensor device 50 is a six-axis combo sensor including the first inertial sensor 45, which is a three-axis gyro sensor, and the second inertial sensor 46, which is a three-axis acceleration sensor, and a periphery thereof is covered with resin 11, which is a resin package. The resin 11 is, for example, an epoxy resin, and the exterior of the sensor device 50 is resin-molded with the resin 11. In other words, the sensor device 50 is resin-molded with the resin 11 as a first package. The second inertial sensor 46 is accommodated in the first package together with the first inertial sensor 45.

Here, according to verification by the inventors, it has been confirmed that, when the sensor device 50 is used directly, for example, when a humidity in a usage environment varies, moisture of an amount corresponding to the varied humidity is adsorbed into a resin mold, and a residual stress inside the resin 11 changes. This stress change causes a variation in a stress constantly applied to the sensor element, resulting in a problem of varying sensor characteristics.

The sensor device 50 includes six sensor elements as described above, and the present disclosure is not limited thereto. For example, three sensor elements may be used as long as at least accelerations of the three axes and angular velocities of the three axes can be detected. In this case, for example, the three sensor elements includes two acceleration sensor elements and one angular velocity sensor element. These three elements are sensor elements capable of detecting the accelerations of the three axes and the angular velocities of the three axes by a composite design such as sharing of detection axes.

Verification Result of Moisture Resistance Characteristics

Figure 10:
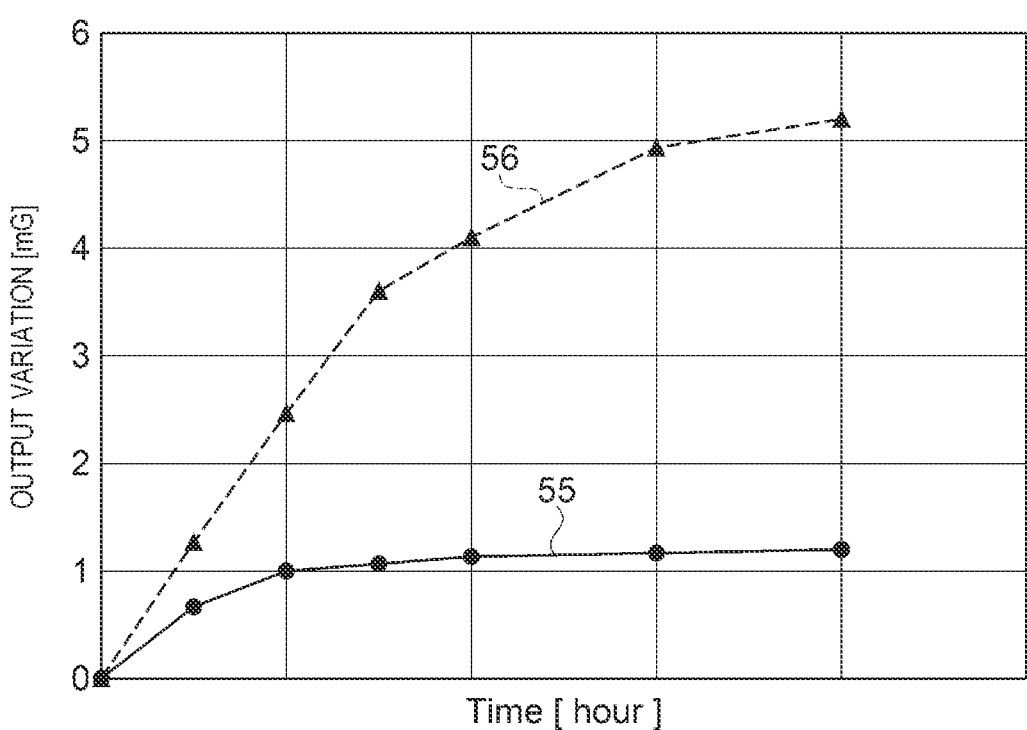
FIG. 10 is a graph showing changes in output variation depending on presence or absence of a sealing material.

FIG. 10 is a graph showing changes in output variation depending on presence or absence of the sealing material, in which a horizontal axis represents time (hour) and a vertical axis represents an output variation (mG).

A graph 55 shown in FIG. 10 is a graph showing an output variation over time under an experimental environment by the inertial measurement device 100 according to the embodiment. A graph 56 is a graph showing an output variation over time under the experimental environment by an inertial measurement device according to a comparative example, and the inertial measurement device according to the comparative example is not provided with the sealing material 9b. In other words, in the inertial measurement device according to the comparative example, the communication hole 4 is open, and the internal space SP communicates with the outside.

As for the experimental environment, the inertial measurement device 100 according to the embodiment and the inertial measurement device according to the comparative example are set together in the same posture under an environment of a normal temperature and a higher humidity than a normal humidity.

It can be seen from the graph 56 of the comparative example that the output variation increases proportionally with passage of time. It is presumed that this bias variation is caused by a fact that external moisture enters through the communication hole 4 and is adsorbed into the resin mold of the resin 11 of the sensor device 50, and a residual stress inside the resin 11 changes.

On the other hand, according to the inertial measurement device 100 according to the embodiment, the output variation is constant and stable at approximately 1 mG even when time passes as shown in the graph 55. In other words, it can be seen that the bias variation is small and a moisture resistance characteristic is stable.

As described above, according to the inertial measurement device 100 in the embodiment and the method for manufacturing the same, the following effects can be attained.

The inertial measurement device 100 includes: the substrate 5 having a joining area 7; the cap 8; the sensor device 50 accommodated in a resin package and disposed in a mounting area 6 on the substrate 5 in the internal space SP between the substrate 5 and the cap 8; and the sealing material 9b and the joining material 9a configured to join the cap 8 to the substrate 5 in the joining area 7 of the substrate 5. The joining material 9a surrounds the mounting area 6 and has the communicating hole 4 for communication between the internal space SP and the outside, and the sealing material 9b closes the communicating hole 4.

According to this, the internal space SP in which the sensor device 50 is accommodated is hermetically sealed by the sealing material 9b. Therefore, it is possible to prevent moisture from entering the sensor device from the outside.

Accordingly, the inertial measurement device 100 that reduces an influence of moisture and that has high detection accuracy can be provided. In other words, the inertial measurement device 100 having excellent moisture resistance and reliability can be provided.

The first lands 1b on which the sensor device 50 is mounted are provided in the mounting area 6, the second land 2 corresponding to the joining material 9a is provided in the joining area 7, the third land 3 is provided outside the communication hole 4, and the sealing material 9b is disposed from the second land 2 to the third land 3.

According to this, since the sealing material 9b can be provided from the second land 2 to the third land 3 by soldering after a reflow process, the communication hole 4 can be sealed.

When a width of the recess 2b, which is an cutout portion of the second land 2 corresponding to the communication hole 4, is a width d, and a length of a portion of the third land 3 facing the communication hole 4 is a length L, the length L is 1.5 times to 5 times the width d.

According to this, when the sealing material 9b is disposed from the second land 2 to the third land 3, the communication hole 4 can be reliably closed, and soldering can be efficiently performed.

The cap 8 is a metal cap, and the joining material 9a and the sealing material 9b are solder.

According to this, the communication hole 4 can be more efficiently closed by soldering.

The recess 2b serving as the communication hole 4 is formed in the cutout portion of the second land 2.

According to this, the communication hole 4 is formed between the flange portion 8b and the recess 2b by mounting the cap 8 on the second land 2.

Second Embodiment

Different Aspect 1 of Inertial Measurement Device

Figure 11:
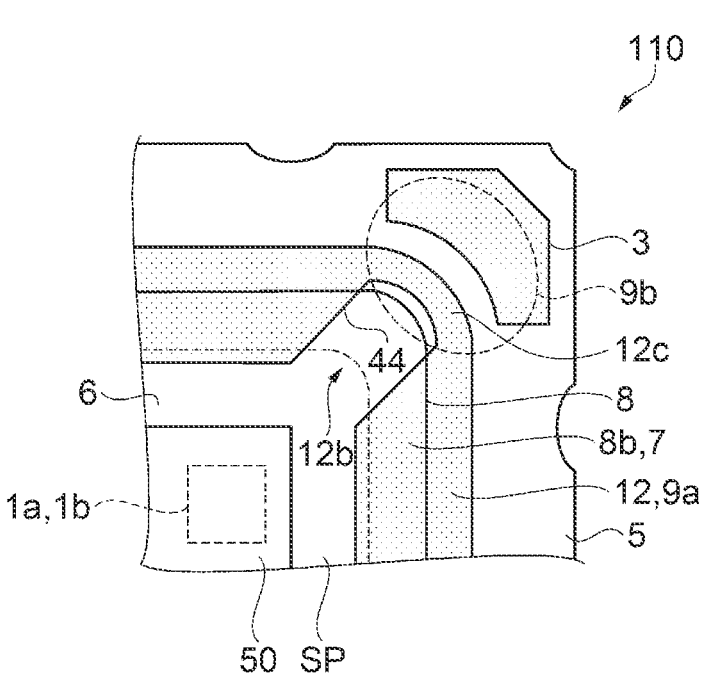
FIG. 11 is a partial plan view of a periphery of a communication hole of an inertial measurement device according to a second embodiment.
Figure 12:
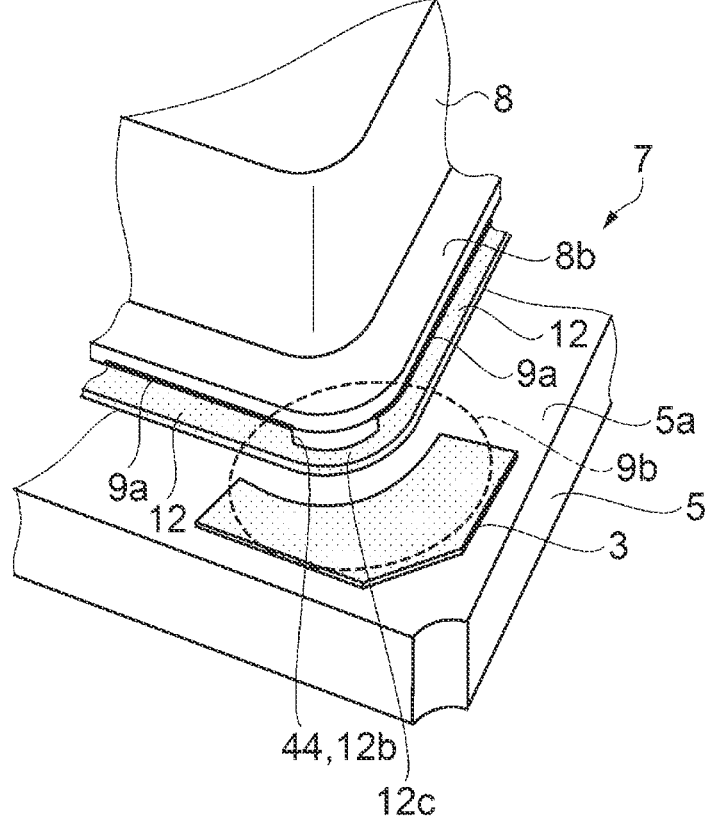
FIG. 12 is an enlarged perspective view of the periphery of the communication hole.

FIG. 11 is a partial plan view of a periphery of a communication hole of an inertial measurement device according to a second embodiment and corresponds to FIG. 1. FIG. 12 is an enlarged perspective view of the periphery of the communication hole and corresponds to FIG. 3.

The second land 2 has a dividing portion in a part of an annular shape as described in the above embodiment. The present disclosure is not limited to this configuration, and a configuration may be used in which a communication hole is formed without a dividing portion. For example, an outer peripheral edge of a second land 12 around a recess 12b may be coupled by a coupling portion 12c. Hereinafter, the same portions as those according to the above embodiment are denoted by the same reference numerals, and the redundant description thereof will be omitted.

As shown in FIG. 11, in an inertial measurement device 110 according to the embodiment, the second land 12 is not divided at a corner portion, and the outer peripheral edge thereof is coupled by the coupling portion 12c. The coupling portion 12c is provided outside the flange portion 8b of the cap 8, and a gap is formed between the flange portion 8b and the coupling portion 12c in a plan view.

As shown in FIG. 12, when the cap 8 is placed on the second land 12, this gap is an opening of a communication hole 44. Accordingly, the communication hole 44 functions as an air hole for communication between the outside and the internal space SP. Other configurations are the same as those described in the first embodiment.

In the inertial measurement device 110, in a state after reflow, the joining material 9a surrounds the mounting area 6 (FIG. 11) and has the communication hole 44 for communication between the internal space SP and the outside as shown in FIG. 12.

When the communication hole 44 is sealed by soldering, the communication hole 44 can be sealed more easily than when the coupling portion 12c is not provided because the coupling portion 12c covers the entire opening of the communication hole 44.

The coupling portion 12c is provided outside the flange portion 8b as described above, and the present disclosure is not limited to this configuration. For example, the coupling portion 12c may be provided inside the flange portion 8b. In this case, a gap is also formed between the flange portion 8b and the coupling portion 12c in a plan view.

As described above, according to the inertial measurement device 110 in the embodiment, the following effects can be attained in addition to the effects according to the above embodiment.

According to the inertial measurement device 110, the internal space SP in which the sensor device 50 is accommodated is hermetically sealed by the sealing material 9b. Therefore, it is possible to prevent moisture from entering the sensor device 50 from the outside.

Accordingly, the inertial measurement device 110 that reduces an influence of moisture and that has high detection accuracy can be provided.

Third Embodiment

Different Aspect 2 of Inertial Measurement Device

Figure 13:
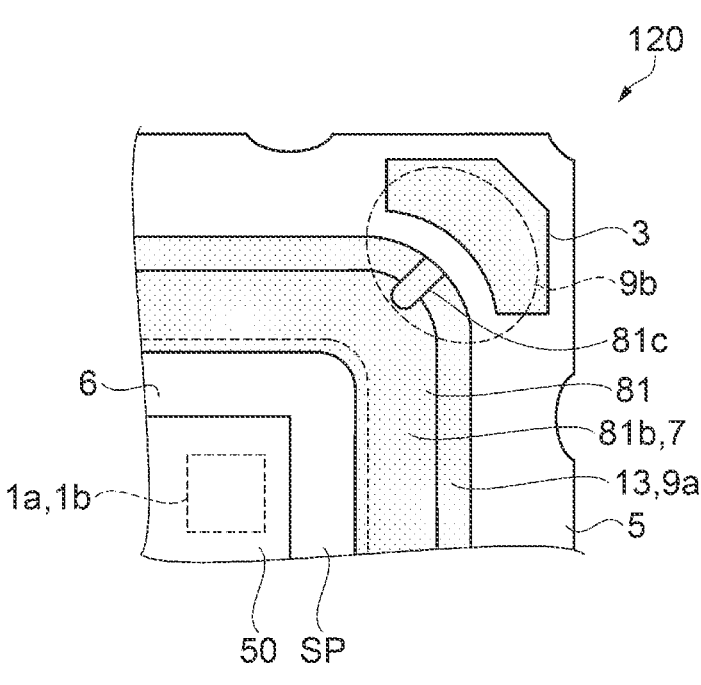
FIG. 13 is a partial plan view of a periphery of a communication hole of an inertial measurement device according to a third embodiment.
Figure 14:
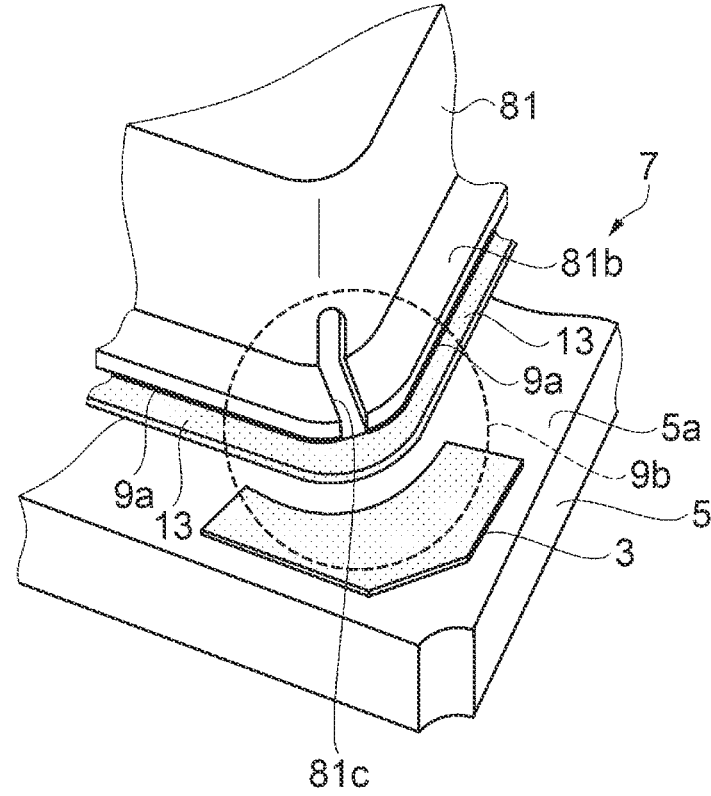
FIG. 14 is an enlarged perspective view of the periphery of the communication hole.

FIG. 13 is a partial plan view of a periphery of a communication hole of an inertial measurement device according to a third embodiment and corresponds to FIG. 1. FIG. 14 is an enlarged perspective view of the periphery of the communication hole and corresponds to FIG. 3.

The communication hole 4 is formed between the recess 2b of the second land 2 and the cap 8 as described in the above embodiment. The present disclosure is not limited to this configuration, and a configuration may be used in which a communication hole is formed in a cap. For example, in the inertial measurement device 120 according to the embodiment, a communication hole 81c is formed in a cap 81. Hereinafter, the same portions as those according to the above embodiment are denoted by the same reference numerals, and the redundant description thereof will be omitted.

As shown in FIG. 13, in the inertial measurement device 120 according to the embodiment, the slit-shaped communication hole 81c is formed at a corner portion of the cap 81. The cap 81 has the same configuration as the cap 8 according to the first embodiment except that the cap 81 has the communication hole 81c. A second land 13 according to the embodiment has no cutout portion, and a corner portion thereof serves as an annularly closed joining land having the same width as that of a linear portion. As shown in FIG. 14, the communication hole 81c is formed from an end portion of the flange portion 81b to a part of a side wall of a main body of the cap 81 across the flange portion 81b. In other words, the communication hole 81c, which is a slit-shaped recess, is formed at a position of the cap 81 corresponding to the third land 3.

In the inertial measurement device 120, in a state after reflow, the joining material 9a surrounds the mounting area 6 (FIG. 13) and has the communication hole 81c for communication between the internal space SP and the outside as shown in FIG. 14.

When the communication hole 81c is to be sealed by soldering, the sealing material 9b covers the communication hole 81c including the part of the side wall of the main body of the cap 81.

As described above, according to the inertial measurement device 120 in the embodiment, the following effects can be attained in addition to the effects according to the above embodiment.

According to the inertial measurement device 120, the internal space SP in which the sensor device 50 is accommodated is hermetically sealed by the sealing material 9b. Therefore, it is possible to prevent moisture from entering the sensor device 50 from the outside.

Accordingly, the inertial measurement device 120 that reduces an influence of moisture and that has high detection accuracy can be provided.

Fourth Embodiment

Different Aspect 3 of Inertial Measurement Device

Figure 15:
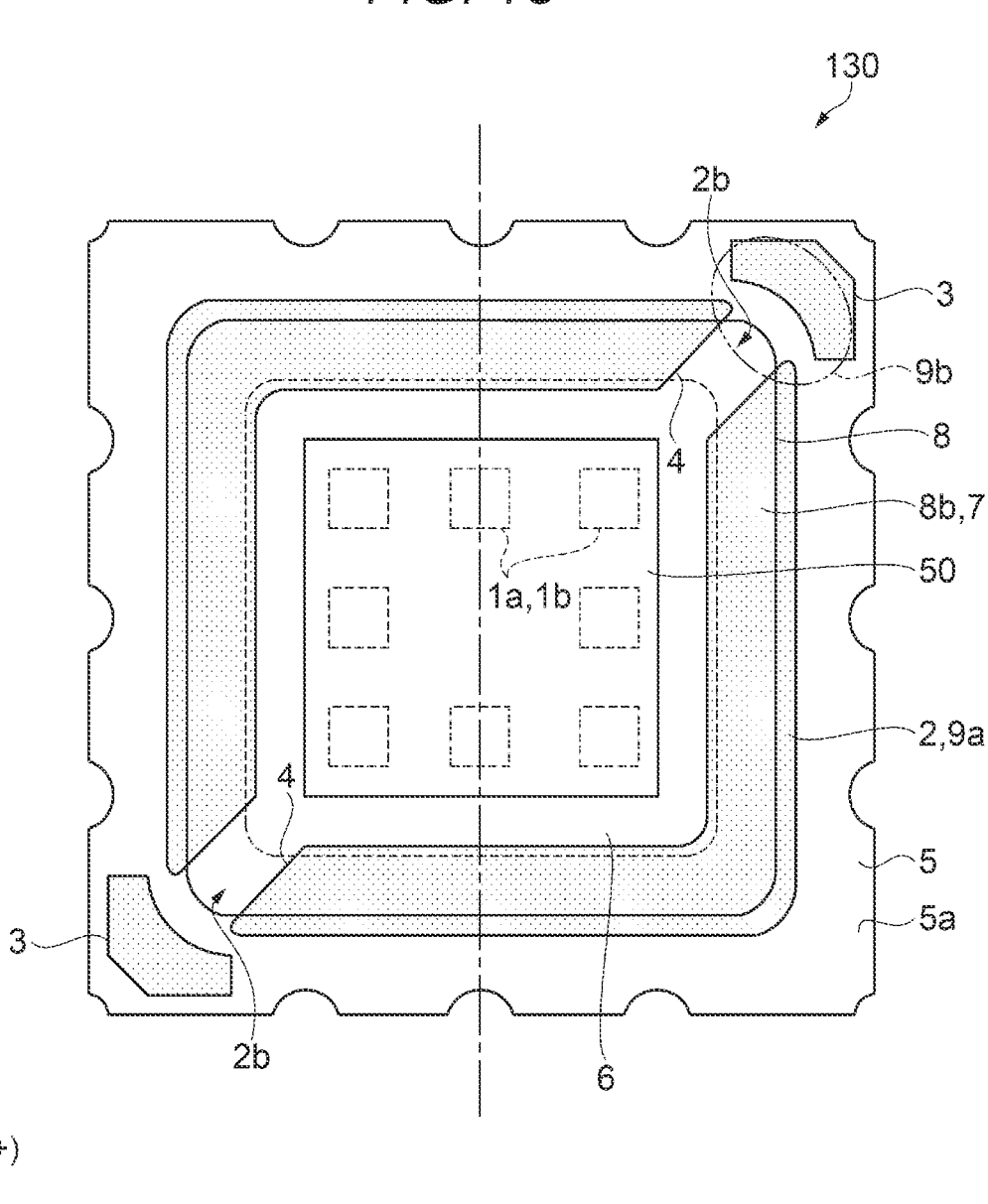
FIG. 15 is a plan view of an inertial measurement device according to a fourth embodiment.
Figure 15:
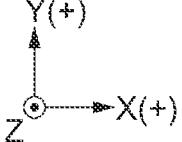
Figure 16:
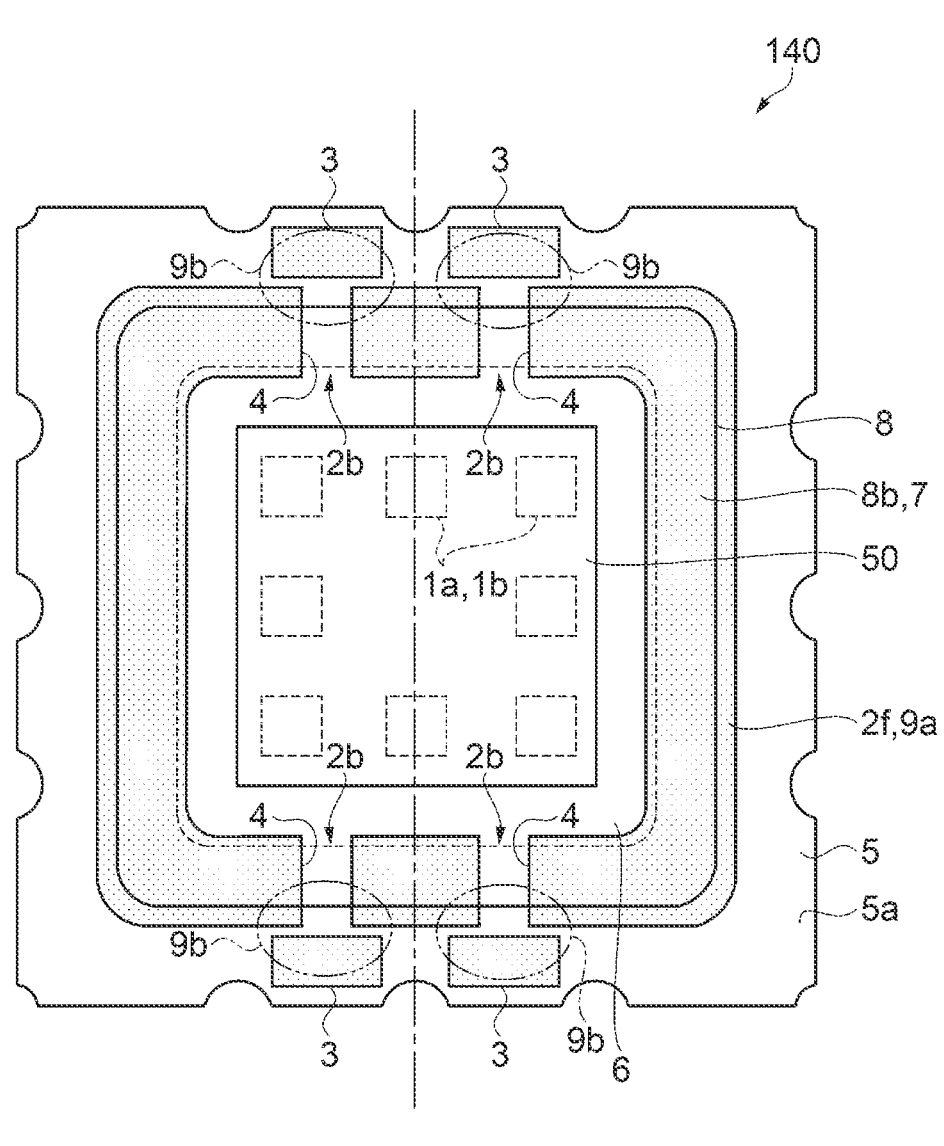
FIG. 16 is a plan view of an inertial measurement device according to a different aspect.
Figure 16:
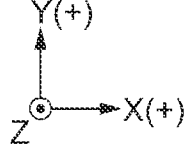

FIG. 15 is a plan view of an inertial measurement device according to a fourth embodiment and corresponds to FIG. 1. FIG. 16 is a plan view of an inertial measurement device according to a different aspect and corresponds to FIG. 1.

One communication hole 4 is formed as described in the above embodiment. The present disclosure is not limited to this configuration, and a configuration may be used in which a plurality of communication holes 4 are formed. The communication hole 4 is not limited to being formed in the corner portion. Hereinafter, the same portions as those according to the above embodiment are denoted by the same reference numerals, and the redundant description thereof will be omitted.

As shown in FIG. 15, in an inertial measurement device 130 according to the embodiment, two communication holes 4 are formed diagonally. Specifically, in addition to the communication hole 4 formed at a corner portion in an X plus direction and a Y plus direction, the communication hole 4 is also formed at a corner portion in an X minus direction and a Y minus direction. In other words, a plurality of communication holes 4 are formed in the joining area 7. The plurality of communication holes 4 face each other across the mounting area 6. Other configurations are the same as those of the inertial measurement device 100 according to the first embodiment.

In an inertial measurement device 140 shown in FIG. 16, four communication holes 4 are formed along sides of a second land 2f. Specifically, two communication holes 4 are formed side by side along one side of the second land 2f in the Y plus direction. Two communication holes 4 are formed side by side along one side of the second land 2f in the Y minus direction. In this way, the communication hole 4 may be formed in a linear portion. In other words, the plurality of communication holes 4 are formed in the joining area 7. The plurality of communication holes 4 face each other across the mounting area 6. Other configurations are the same as those of the inertial measurement device 100 according to the first embodiment.

As described above, according to the inertial measurement devices 130 and 140 in the embodiment, the following effects can be attained in addition to the effects according to the above embodiment.

According to the inertial measurement devices 130 and 140, the internal space SP in which the sensor device 50 is accommodated is hermetically sealed by the sealing material 9b. Therefore, it is possible to prevent moisture from entering the sensor device 50 from the outside.

Accordingly, the inertial measurement devices 130 and 140 that reduce an influence of moisture and that have high detection accuracy can be provided.

Fifth Embodiment

Different Aspect 4 of Inertial Measurement Device

Figure 17:
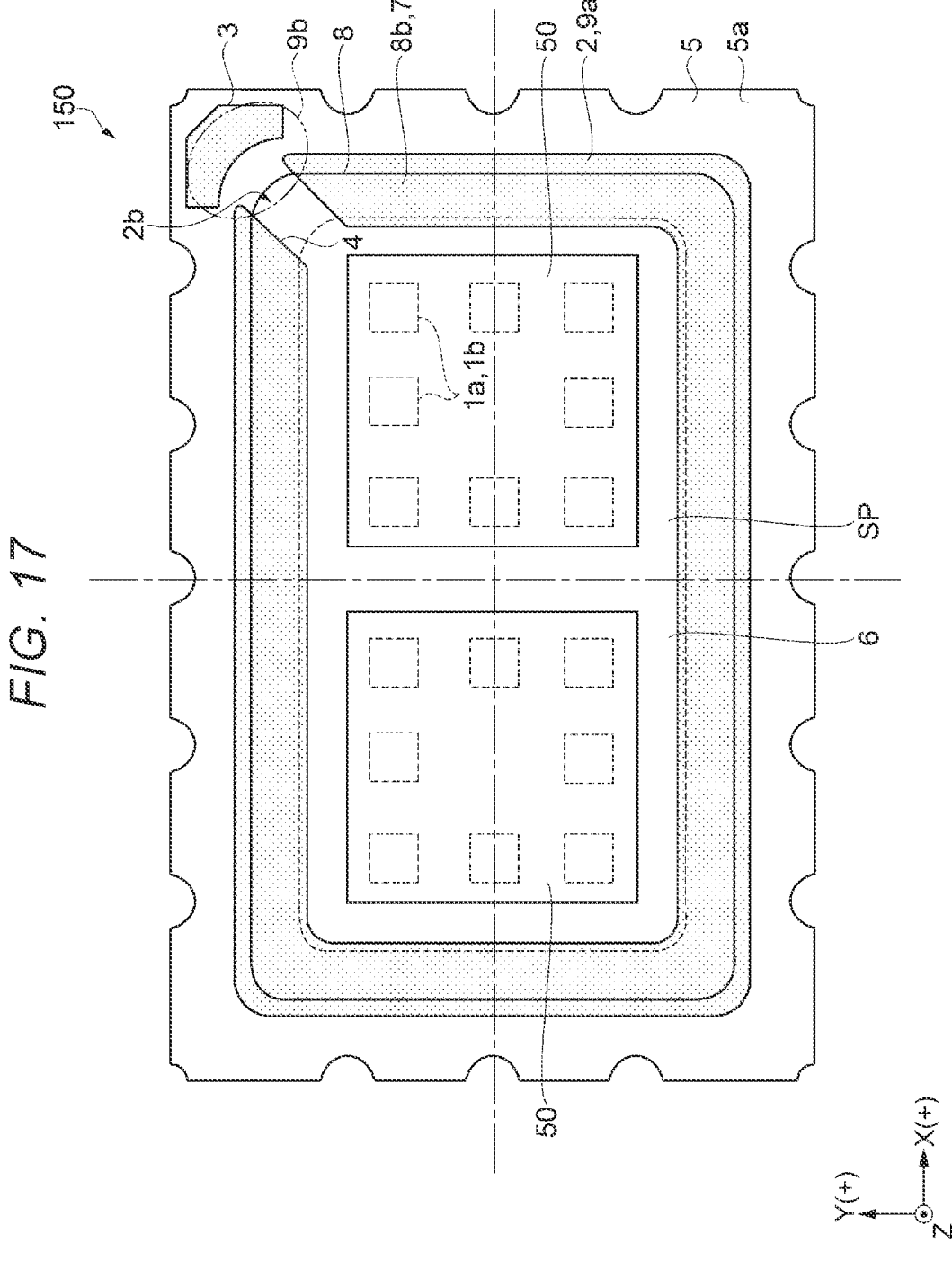
FIG. 17 is a plan view of an inertial measurement device according to a fifth embodiment.

FIG. 17 is a plan view of an inertial measurement device according to a fifth embodiment and corresponds to FIG. 1.

One sensor device 50 is accommodated in the internal space SP as described in the above embodiment. The present disclosure is not limited to this configuration, and a plurality of sensor devices 50 may be accommodated in the internal space SP. Hereinafter, the same portions as those according to the above embodiment are denoted by the same reference numerals, and the redundant description thereof will be omitted.

As shown in FIG. 17, in an inertial measurement device 150 according to the embodiment, two sensor devices 50 are accommodated in the internal space SP. Specifically, the substrate 5 and the cap 8 are provided in a rectangular shape elongated in the X direction, and the internal space SP also has a rectangular shape elongated horizontally, in which the two sensor devices 50 are arranged side by side. The number of sensor devices 50 is not limited to two as long as the number of sensor devices 50 is plural. One communication hole 4 is formed at a corner portion in the X plus direction and the Y plus direction. A plurality of communication holes 4 may be formed as in the fourth embodiment. Other configurations are the same as those of the inertial measurement device 100 according to the first embodiment.

The two sensor devices 50 are accommodated in the internal space SP as described above. The present disclosure is not limited thereto, and any resin-molded device may be used. For example, the first inertial sensor and the second inertial sensor 46 may be arranged side by side in the internal space SP. The first inertial sensor is a three-axis angular velocity sensor that is resin-molded as one device, and the second inertial sensor 46 is a three-axis acceleration sensor that is resin-molded as one device.

As described above, according to the inertial measurement device 150 in the embodiment, the following effects can be attained in addition to the effects according to the above embodiment.

According to the inertial measurement device 150, the internal space SP in which the plurality of sensor devices 50 are accommodated is hermetically sealed by the sealing material 9b. Therefore, it is possible to prevent moisture from entering the sensor devices 50 from the outside.

Accordingly, the inertial measurement device 150 that reduces an influence of moisture and that has high detection accuracy can be provided.

Sixth Embodiment

Inertial Measurement Unit

Figure 18:
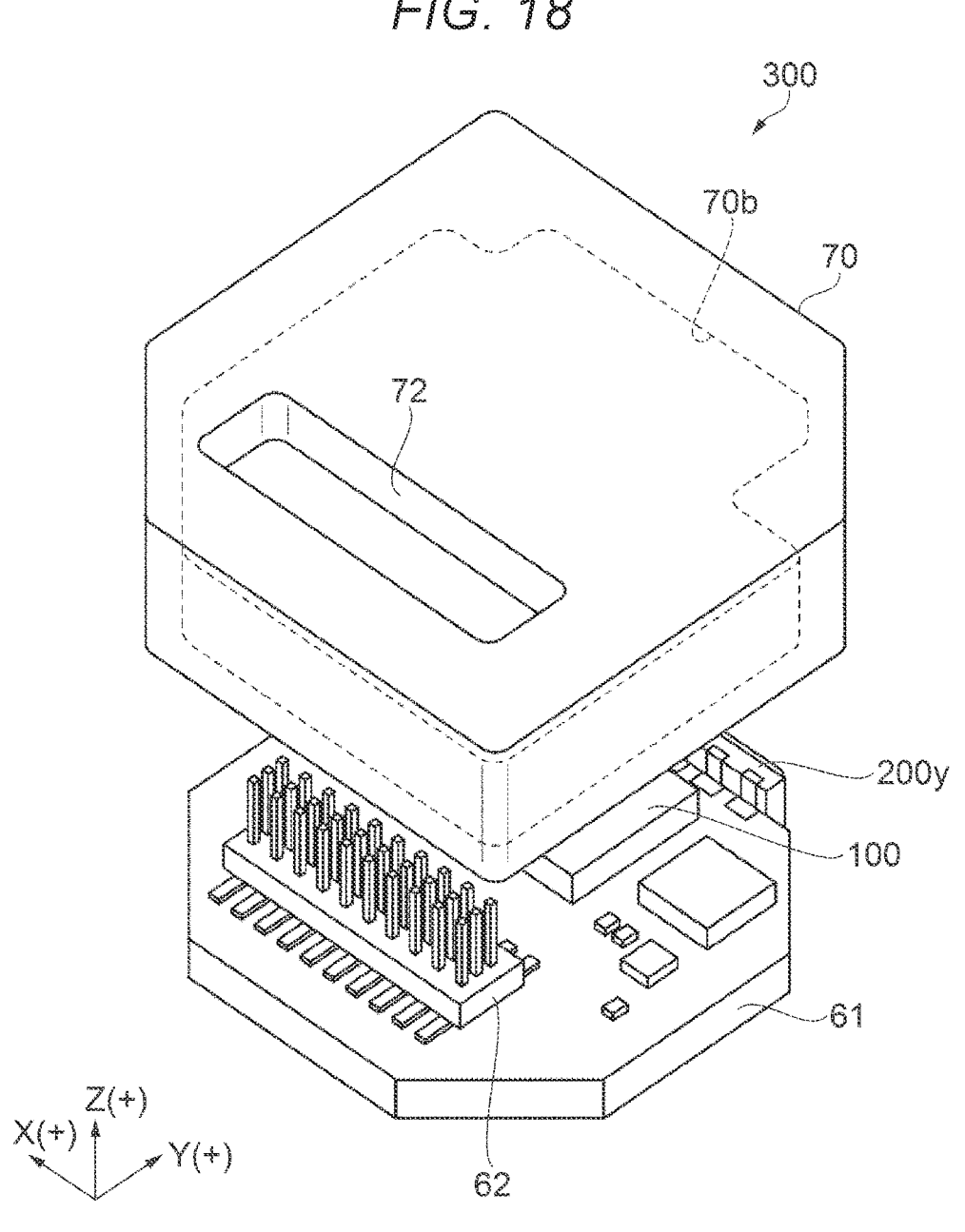
FIG. 18 is an exploded perspective view showing an inertial measurement unit according to a sixth embodiment.
Figure 19:
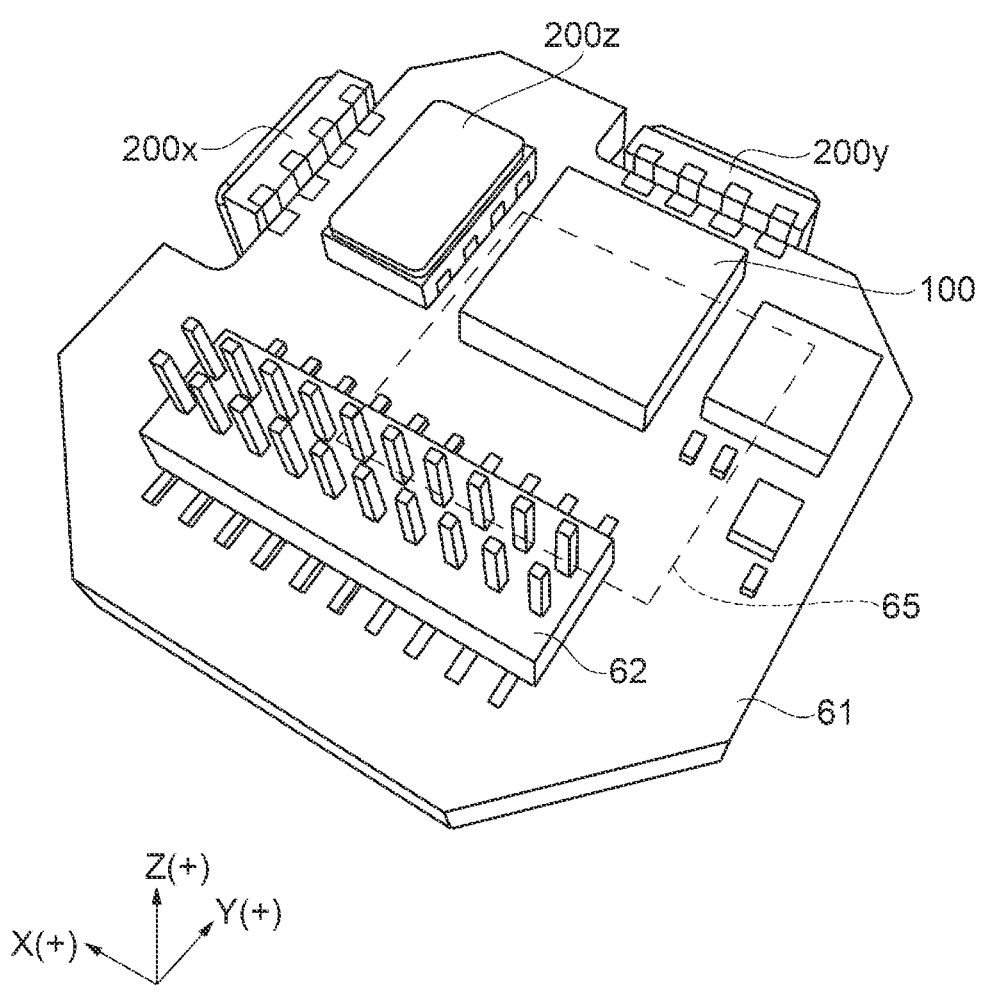
FIG. 19 is a perspective view of a substrate.

FIG. 18 is an exploded perspective view showing an inertial measurement unit. FIG. 19 is a perspective view of a substrate.

The inertial measurement device 100 described in the above embodiment can be applied to an inertial measurement unit 300 to be used in a monitoring system for a structure such as a bridge or an elevated track requiring high accuracy. The same portions as those according to the above embodiment are denoted by the same reference numerals, and the redundant description thereof will be omitted.

As shown in FIG. 18, the inertial measurement unit 300 according to the embodiment includes a connector 62 for easy coupling to a measurement device in a higher-level monitoring system that is not shown. The inertial measurement unit 300 includes a case 70 and a substrate 61.

The case 70 covers and protects the substrate 61, and an opening 72 for exposing the connector 62 is formed in an upper surface of the case 70. The connector 62 is a plug-type (male) connector, and includes two rows of coupling terminals.

A recess 70b for accommodating the substrate 61 on which the inertial measurement device 100 and the like are mounted is formed in a lower surface of the case 70.

For example, a female connector corresponding to the connector 62 can be coupled through the opening 72 while the substrate 61 is assembled in the recess 70b of the case 70.

As shown in FIG. 19, the substrate 61 is, for example, a rigid substrate such as a glass epoxy substrate. The substrate 61 has a substantially octagonal shape in a plan view, and the connector 62 is provided along one side of the substrate 61.

A plurality of electronic components including the inertial measurement device 100, the connector 62, a control IC 65, an angular velocity sensor 200z, an angular velocity sensor 200x, an angular velocity sensor 200y, a chip resistor, a chip capacitor, and the like are mounted on the substrate 61. The control IC 65 is mounted on a back surface of the substrate 61. The substrate 61 may be common to the substrate 5. In this case, the sensor device 50 and the cap 8 may be mounted on the substrate 61, or the first lands 1b, the second land 2, and the third land 3 may be formed on the substrate 61.

The control IC 65 is a micro controller unit (MCU) and controls each unit of the inertial measurement unit 300. A storage unit provided in the control IC 65 stores a program for defining an order and contents for detecting an acceleration and an angular velocity, a program for digitalizing detection data and incorporating the detection data into packet data, accompanying data, and the like.

The angular velocity sensor 200z is mounted on a front surface of the substrate 61. The front surface is a surface on a case 70 side. The angular velocity sensor 200z is a gyro sensor that detects an angular velocity of one axis in a Z-axis direction. A vibrating gyro sensor that uses quartz crystal as a vibrator and that detects an angular velocity from a Coriolis force applied to a vibrating object is used in a preferred example. The sensor is not limited to the vibrating gyro sensor, and may be any sensor capable of detecting an angular velocity. For example, a sensor using ceramic or silicon may be used as a vibrator.

The angular velocity sensor 200x is a gyro sensor that detects an angular velocity of one axis in an X-axis direction, and is disposed at a side surface of the substrate 61 in the X-axis direction such that the mounting surface is orthogonal to the X axis. The angular velocity sensor 200y is a gyro sensor that detects an angular velocity of one axis in a Y-axis direction, and is disposed at a side surface of the substrate 61 in the Y-axis direction such that the mounting surface is orthogonal to the Y axis.

Figure 20:
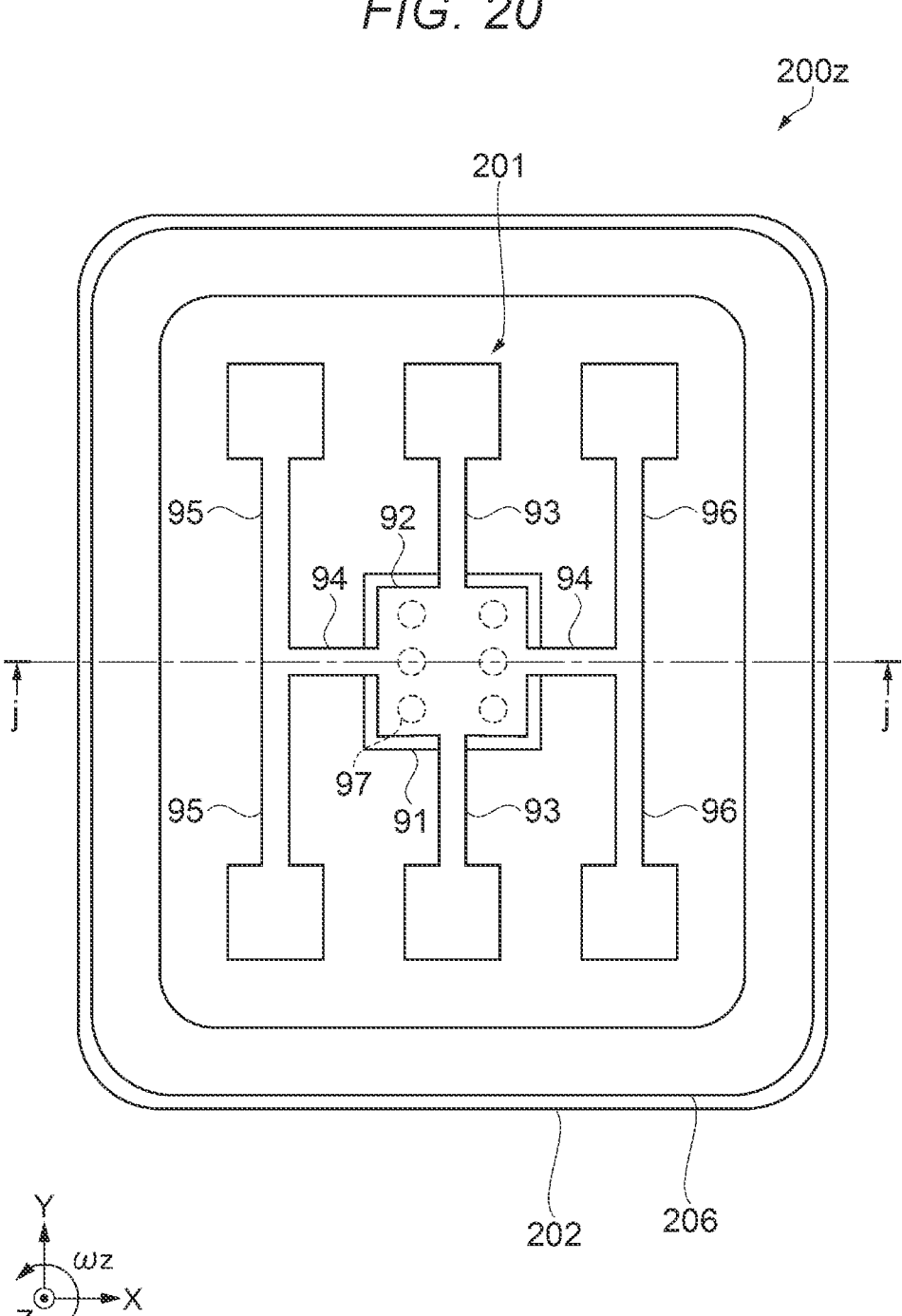
FIG. 20 is a transparent plan view of an angular velocity sensor.
Figure 21:
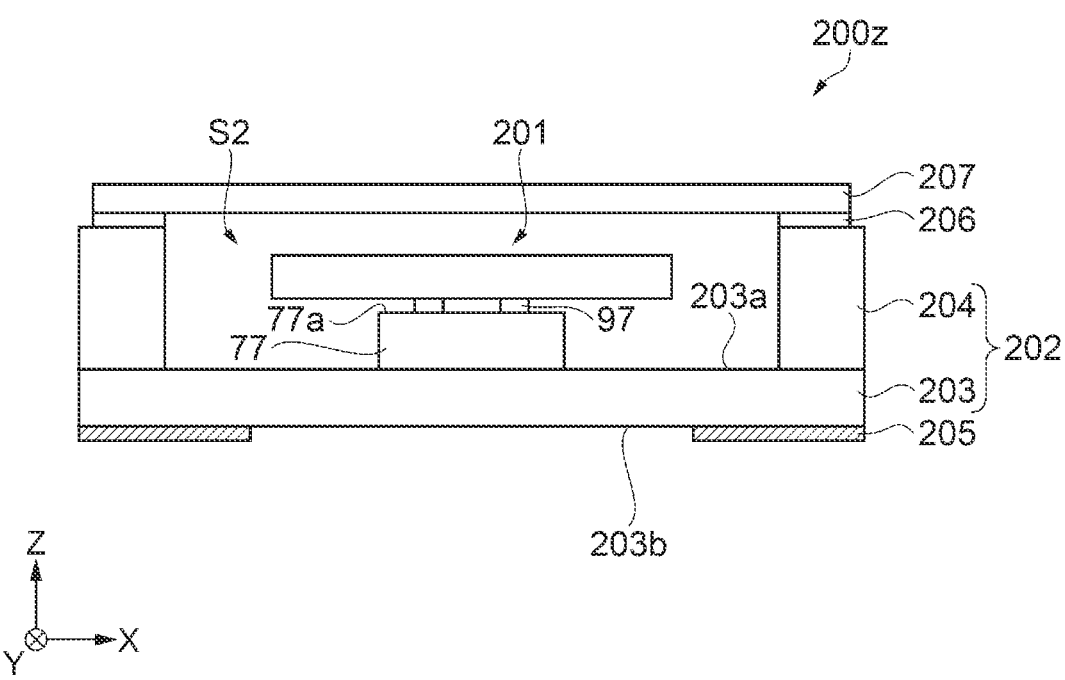
FIG. 21 is a cross-sectional view taken along a line j-j in FIG. 20.

FIG. 20 is a transparent plan view of the angular velocity sensor. FIG. 21 is a cross-sectional view taken along a line j-j in FIG. 20.

Next, a configuration of the angular velocity sensor 200z will be described. The angular velocity sensor 200x and the angular velocity sensor 200y have the same configuration as the angular velocity sensor 200z.

The angular velocity sensor 200z shown in FIG. 20 includes a vibrating gyro sensor element 201. The vibrating gyro sensor element 201 is a gyro sensor element manufactured by processing a quartz crystal substrate using a photolithography technique, and converts vibration of a detection vibrating arm into an electric signal to detect an angular velocity. Since quartz crystal is used as a base material, temperature characteristics are excellent. Therefore, the gyro sensor element is less likely to be affected by external noise or temperature and has high detection accuracy as compared to the gyro sensor element manufactured using the MEMS technique.

As shown in FIGS. 20 and 21, the angular velocity sensor 200z includes the vibrating gyro sensor element 201, a base 202 made of ceramic or the like for accommodating the vibrating gyro sensor element 201, and a lid 207 made of glass, ceramic, metal or the like.

The base 202 is formed by stacking a plate-shaped first substrate 203 and a frame-shaped second substrate 204. The base 202 has an accommodating space S2 that is open upward. The accommodating space S2 for accommodating the vibrating gyro sensor element 201 is hermetically sealed in a depressurized state, preferably in a state close to vacuum, by joining the lid 207 with a joining member 206 such as a seal ring.

A protrusion 77 protruding upward is formed at an upper surface 203a of the first substrate 203 of the base 202, and the vibrating gyro sensor element 201 is electrically and mechanically fixed to an upper surface 77a of the protrusion 77 via metal bumps 97 or the like. Therefore, contact between the vibrating gyro sensor element 201 and the first substrate 203 can be prevented.

A plurality of mounting terminals 205 are provided at a lower surface 203*b* of the first substrate 203 of the base 202. The mounting terminals 205 are electrically coupled to the vibrating gyro sensor element 201 via wirings that are not shown.

The vibrating gyro sensor element 201 includes a base portion 92 located in a central portion, a pair of detection vibrating arms 93 extending in the Y direction from the base portion 92, a pair of coupling arms 94 extending in the X direction from the base portion 92 in a manner of being orthogonal to the detection vibrating arms 93, and a pair of driving vibrating arms 95 and a pair of driving vibrating arms 96 each extending in the Y direction from a tip end side of the coupling arm 94 in a manner of being parallel to the detection vibrating arms 93. The vibrating gyro sensor element 201 is electrically and mechanically fixed to the upper surface 77*a* of the protrusion 77 provided at the base 202 via the metal bumps 97 or the like in the base portion 92.

When an angular velocity ωz around the Z axis is applied while the driving vibrating arms 95 and 96 are vibrating in a bending manner in the X direction in opposite phases, a Coriolis force in the Y direction acts on the driving vibrating arms 95 and 96 and the coupling arms 94, and the vibrating gyro sensor element 201 vibrates in the Y direction. This vibration causes the detection vibrating arms 93 to vibrate in a bending manner in the X direction. Therefore, the angular velocity ωz is obtained by detecting distortion of the quartz crystal generated by the vibration as an electric signal by detection electrodes formed on the detection vibrating arms 93.

As described above, according to the inertial measurement unit 300 in the embodiment, the following effects can be attained in addition to the effects according to the above embodiment.

The inertial measurement unit 300 includes the angular velocity sensor 200*x*, the angular velocity sensor 200*y*, and the angular velocity sensor 200*z* that have high accuracy and that use quartz crystal as resonators, in addition to the inertial measurement device 100 having excellent moisture resistance and reliability.

Accordingly, the inertial measurement unit 300 having excellent reliability and high accuracy can be provided.

What is claimed is:
1. An inertial measurement device comprising:
a substrate having a joining area;
a cap;

16 a sensor device accommodated in a resin package and disposed in a mounting area on the substrate in an internal space between the substrate and the cap; and
a sealing material and a joining material configured to join the cap to the substrate in the joining area of the substrate,
wherein
the joining material surrounds the mounting area and has a communication hole for communication between the internal space and outside,
the sealing material closes the communication hole,
a first land on which the sensor device is mounted is provided in the mounting area,
a second land corresponding to the joining material is provided in the joining area,
a third land is provided outside the communication hole, and
the sealing material is disposed from the second land to the third land.
2. The inertial measurement device according to claim 1, wherein
when a width of a cutout portion of the second land corresponding to the communication hole is a width d, and a length of a portion of the third land facing the communication hole is a length L, the length L is 1.5 times to 5 times the width d.
3. The inertial measurement device according to claim 2, wherein
the cap is a metal cap, and the joining material and the sealing material are solder.
4. The inertial measurement device according to claim 2, wherein
a recess serving as the communication hole is formed in the cutout portion of the second land.
5. The inertial measurement device according to claim 1, wherein
a recess serving as the communication hole is formed at a position of the cap corresponding to the third land.
6. The inertial measurement device according to claim 1, wherein
the joining area includes a bent portion, and
the communication hole is formed in the bent portion.
7. The inertial measurement device according to claim 1, wherein
a plurality of the communication holes are formed in the joining area.
8. The inertial measurement device according to claim 7, wherein
the plurality of communication holes face each other across the mounting area.

* * * * *